United States Patent [19]
Klingebiel

[11] 3,941,529
[45] Mar. 2, 1976

[54] APPARATUS FOR FORMING THERMOPLASTIC ARTICLES

[75] Inventor: Ward J. Klingebiel, Somerville, N.J.

[73] Assignee: Union Carbide Corporation, New York, N.Y.

[22] Filed: July 11, 1974

[21] Appl. No.: 487,647

Related U.S. Application Data

[60] Division of Ser. No. 42,317, June 1, 1970, abandoned, which is a continuation-in-part of Ser. No. 704,639, Feb. 12, 1968, abandoned.

[52] U.S. Cl. .................. 425/4 R; 425/242 B; 425/8; 259/8
[51] Int. Cl.² ..................... B29G 7/02; B29D 27/00
[58] Field of Search ........... 425/244, 246, 259, 205, 425/208, 4 R, 817 R, 207, 197; 18/30 A, 30 J, 30 S, 30 B–30 E, 30 G–30 K, 30 R, 30 S, 30 T, 12 SA–12 SC, 12 SE–12 H, 12 J, 12 SN–12 SP, 12 SR–12 ST, 12 SW–12 SZ; 259/191, 8; 264/328, 329

[56] References Cited
UNITED STATES PATENTS

| | | | |
|---|---|---|---|
| 2,488,129 | 11/1949 | Lande | 425/311 |
| 3,168,290 | 2/1965 | Wallace | 259/8 |
| 3,171,160 | 3/1965 | Moyer | 425/207 |
| 3,239,882 | 3/1966 | Yokana | 259/191 |
| 3,436,446 | 4/1969 | Angell | 425/4 |
| 3,746,492 | 7/1973 | DeVita | 425/244 |
| 3,809,518 | 5/1974 | Lloyd et al. | 425/244 |
| 3,861,841 | 1/1975 | Hanning | 425/DIG. 255 |

*Primary Examiner*—Francis S. Husar
*Assistant Examiner*—Robert J. Charvat
*Attorney, Agent, or Firm*—Gerald R. O'Brien

[57] ABSTRACT

Apparatus is disclosed for molding foamed thermoplastic articles characterized by a cellular core and a substantially non-cellular integral peripheral shell comprising:

a. extruder means adapted to flux a thermoplastic material;

b. Disperser means connected to said extruder means for producing a dispersion of fluid blowing agent in the fluxed thermoplastic material comprising a cylindrical barrel having therein at least one ratatable disc dispersion unit with an alternating spaced series of perforated-solid rotating discs; said perforated disc, providing a high shear mixing zone, having outer edge surfaces in close rotating clearance with the inner walls of said barrel; the outer edge surface of said rotating disc being spaced from the inner walls of said barrel to form an intense shear mixing zone; and wherein said blowing agent is dispersed when passed through the apertures of said perforated disc and is intimately dispersed throughout the thermoplastic material when passed through said intense shear zone;

c. accumulation chamber means in communication with said disperser adapted to receive the mixture from said disperser and to maintain said mixture in the molten state and at a pressure above the foaming pressure of said mixture;

d. mold means adapted to be maintained at a pressure no greater than the pressure at which said mixture foams and expands;

e. means for establishing and terminating communication between said mold means and said accumulation means at a point where the pressure in above the foaming pressure of said mixture; and f. means connected to said accumulator for rapidly forcing said mixture out of said accumulations means and into said mold when communication is established therebetween.

5 Claims, 4 Drawing Figures

U.S. Patent   March 2, 1976   3,941,529
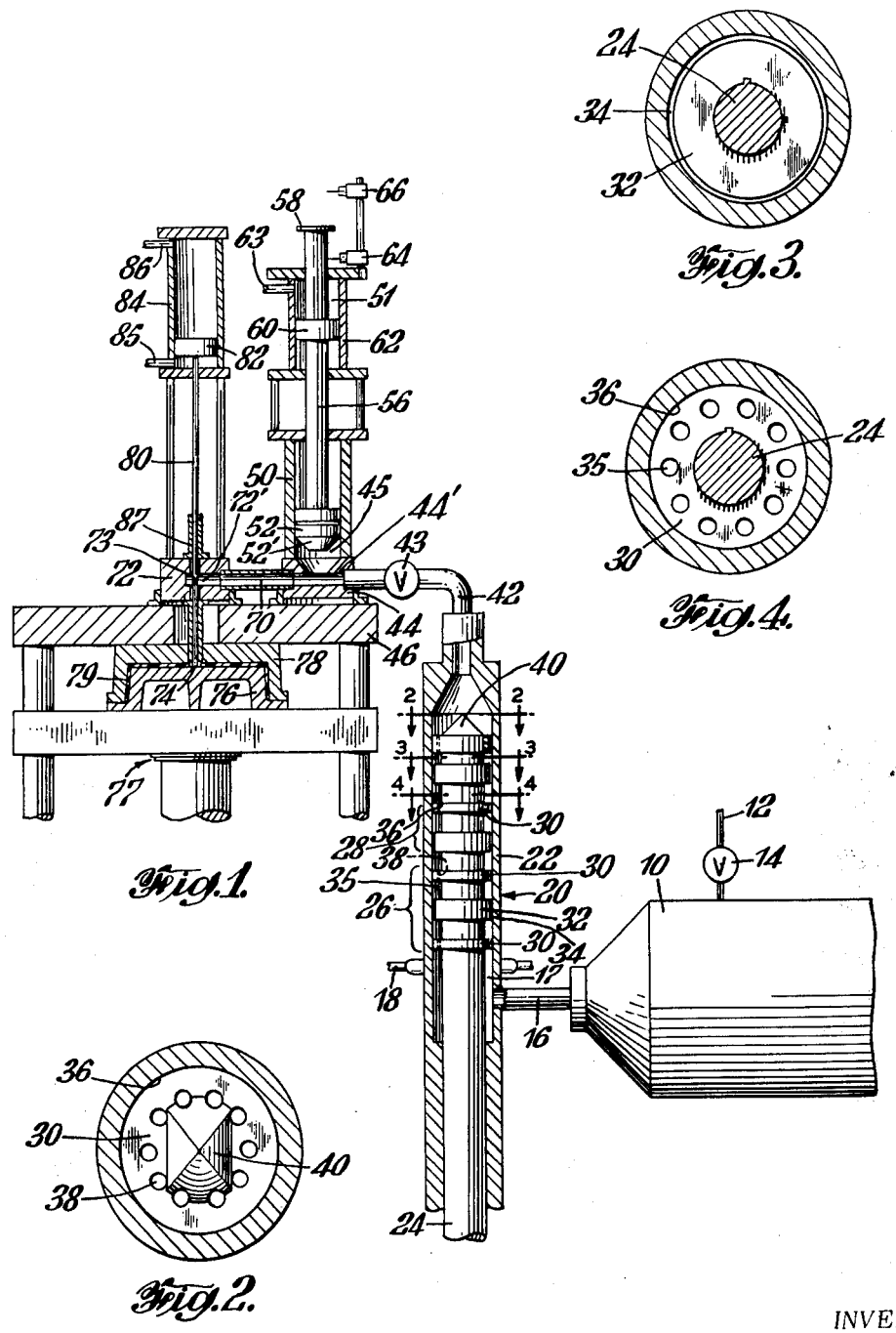
INVENTOR.
WARD J. KLINGEBIEL
BY
ATTORNEY

APPARATUS FOR FORMING THERMOPLASTIC ARTICLES

This is a division of my earlier application Ser. No. 42,317, filed June 1, 1970 which is a continuation-in-part of my original U.S. patent application Ser. No. 704,639, filed Feb. 12, 1968, both of such prior applications now being abandoned.

BACKGROUND

The present invention relates to an improved apparatus for randomly dispersing a fluid blowing agent throughout a thermoplastic material of high viscosity in the molding of foamed thermoplastic articles characterized by a cellular core and a substantially non-cellular, integral peripheral shell.

In order to obtain a foamed thermoplastic article, it is necessary that a fluid blowing agent be mixed with the foamable thermoplastic material. In the conventional operation of molding foamed thermoplastic articles, as described in U.S. Pats. Nos. 3,268,636 and 3,436,446 the fluid blowing agent is introduced into an extruder containing foamable thermoplastic material and maintained at a temperature above the melting temperature of the thermoplastic and at a pressure above the foaming pressure of the fluid blowing agent. The mixture is passed into an accumulation zone and thereafter foamed and molded in a mold. The mixing of the fluid blowing agent and the foamable thermoplastic occurs only as the materials are passed through the extruder.

It is desirable that foamed thermoplastic articles characterized by a cellular core and a substantially non-cellular peripheral shell have uniform cell structure of controllable size. Such products require uniform dispersion of the fluid blowing agent throughout the foamable thermoplastic materials. However, the incompatibility of the fluid blowing agent and the thermoplastic material makes uniform dispersion in an extruder extremely difficult.

An improved extrusion apparatus is disclosed in U.S. Pat. No. 3,329,882. This invention provides in combination with an extruder an apparatus adapted to provide high and low shearing force. This apparatus has been found desirable when used to mix solids, as when color blends are used and uniform color dispersion is desired. Also, when working with high density or linear polyethylene which is to be extruded in the form of thin films, this apparatus prevents gel particles or fish eyes (particles which have not melted or been plasticized) from being extruded. However, this apparatus has not been suitable for mixing low viscosity fluid blowing agents with high viscosity thermoplastic melts such as in the molding of foamed thermoplastic wherein a low viscosity blowing agent has to be dispersed throughout a high viscosity thermoplastic material. This apparatus does not provide a means for breaking up the low viscosity fluid and it has been found that simply subjecting a mixture to shearing force without first breaking up the low viscosity fluid is inadequate for obtaining thermoplastic articles characterized by uniform cell structure of controllable size.

This invention providea apparatus for mixing a low viscosity fluid blowing agent with a high viscosity thermoplastic melt which is relatively simple in construction for accomplishing the same.

SUMMARY

The apparatus of the invention comprises:

a. extruder means adapted to flux a thermoplastic material;

b. disperser means comprising a cylindrical barrel having therein at least one rotatable disc dispersion unit with an alternating spaced series of perforated-solid rotating discs; said perforated disc, providing a high shear mixing zone, having outer edge surfaces in close rotating clearance with the inner walls of said barrel; the outer edge surface of said solid rotating disc being spaced from the inner walls of said barrel to form an intense shear mixing zone; and wherein said blowing agent is dispersed when passed through the apertures of said perforated disc and is intimately dispersed throughout the thermoplastic material when passed through said intense shear zone;

c. accumulation chamber means in communication with said disperser adapted to receive the mixture from said disperser and to maintain said mixture in the molten state and at a pressure above the foaming pressure of said mixture;

d. mold means adapted to be maintained at a pressure no greater than the pressure at which said mixture foams and expands;

e. means for establishing and terminating communication between said molds and said accumulation means at a point where the pressure is above the foaming pressure of said mixture; and f. means for rapidly forcing said mixture out of said accumulation means and into said mold communication is established therebetween.

As employed herein, the following terms are understood to have the following meanings:

"Thermoplastic material" means any synthetic organic thermoplastic mass which is flowable under the temperature and pressure conditions employed in the present invention, such mass being stable above its softening point under the conditions of extrusion, mixing and molding.

"High viscosity" is understood to mean a viscosity greater than about 1000 centipoises.

"Low viscosity" is understood to mean a viscosity in the range from about 0.01 centipoises to about several centipoises it being understood that the ratio of viscosity of the high viscosity thermoplastic material to that of the low viscosity fluid blowing agent is 1000:1 or higher.

"Intimate dispersion" is understood to mean that the low viscosity fluid blowing agent phase of the dispersion contains particles of the order of about 10–100 microns in size.

"Low shear mixing zone" is understood to mean a mixing zone in which shear gradients are not sufficiently intense to exceed the characteristic relaxation rate of the thermoplastic mass being mixed. Such low shear mixing zone may be defined, in one case, as a shear rate of the order of magnitude of about 10 sec.$^{-1}$.

"High shear mixing zone" is understood to mean the mixing zone in which shear gradients are sufficiently intense to further subdivide and reduce the randomly-distributed low viscosity fluid blowing agent regions (bubbles) dispersed in the high viscosity polymer in size to provide a finer dispersion. Such shear rates, in one case, were of the order of magnitude of about 100 sec.$^{-1}$.

"Intense shear mixing zone" is understood to mean a mixing zone in which the shear gradients are sufficiently intense to exceed the characteristic relaxation rate of the thermoplastic mass being mixed. Such shear rates, for one case, were of the order of magnitude of about 1000 sec.$^{-1}$.

It should be noted that, whereas the shear rates indicated with respect to the case of one specific thermoplastic material and viscosity fluid present a ratio of approximately 10:100:1000 for low, high, and intense shear mixing zones, these shear ratios will be found to vary based on the low viscosity fluid and high viscosity polymer or polymer solution to be mixed. However, whereas the value of shear rates obtained in each of the low, high, and intense shear mixing zones will vary depending upon the selection of the low viscosity fluid and polymer or polymer solution mass, the ratio of the shear rates for these mixing zones will follow essentially the approximately 10:100:1000 ratio obtained in the specific case, which is set forth merely by way of example.

"Foaming pressure" is understood to mean that pressure above which the mixture of thermoplastic material and fluid blowing agent is maintained substantially unexpanded (in volume).

"Low viscosity fluid regions" or "bubbles" is understood to mean the distributed gaseous or liquid phase dispersed in the high viscosity polymer-containing mass.

It is important that the intimate dispersion produced by the mixing steps of the process of the present invention be properly handled, subsequent to its formation, in order to prevent coalescence of the low viscosity fluid blowing agent of the intimate dispersion. This may be accomplished in a number of ways so as to randomize and make more homogeneous the entire dispersion and re-direct its flow so as to prevent coalescence.

The present invention may be carried out by providing six separate zones or regions of mixing. Gross premixing is first effected in a first low shear mixing zone by the injection of the low viscosity fluid blowing agent as bubbles into the high viscosity flowable thermoplastic melt. A second zone of high mechanical shear is provided (which may comprise the perforations or aperture means of a perforated spinning disc) to effect a subdivision of the low viscosity fluid blowing agent bubbles in the thermoplastic melt, thereby forming a finer dispersion. The third mixing zone provided is a mixing region characterized by viscoelastic secondary flow patterns which direct the dispersion mass toward a region of intense shear gradients. The fourth mixing zone of intense shear gradient causes the characteristic relaxation rate of the polymer-containing mass to be exceeded and to thereby effect multiple fracture (melt fracture) of the mass and produce an intimate dispersion of the low viscosity fluid blowing agent in the high viscosity melt. It is understood that the fracture or subdivision of the thermoplastic melt in this zone is such that the melt is subdivided and the low viscosity fluid bubbles fill the voids caused by the subdivision of the melt. This results in the production of a very intimate dispersion which may then be randomized and redirected in flow in a succeeding fifth low shear mixing zone (similar to the pre-mixing region discussed hereinabove). The intimately dispersed mass is then forced through a sixth mixing zone of high mechanical shear (which may again comprise the performations or aperture means of a rotating perforated spinning disc). The passage of the intimately dispersed mass through these last two zones of low shear (simple) mixing and high mechanical shear mixing causes a redirection of flow of the mass, thereby preventing coalescence of the dispersion mass, i.e., return to a less finely divided dispersion.

The apparatus of the present invention will become readily apparent from the following description taken in conjunction with the following drawing wherein:

DRAWING

FIG. 1 is a partly broken away side elevational view of the preferred spinning disc disperser employed in connection with extruder and accumulator for the production of foamed thermoplastic articles.

FIG. 2 is a cross-sectional view of the spinning disc disperser of the invention taken along line 2—2 of FIG. 1.

FIG. 3 is a cross-sectional view of the spinning disc dispenser of the invention taken along line 3—3 of FIG. 1.

The preferred apparatus of the present invention for the molding of foamed thermoplastic articles characterized by a cellular core and a substantially non-cellular, integral peripheral shell as illustrated in FIG. 1, is shown to include an extruder 10 having attached thereto a line 12 for feeding a liquid or compressed gas blowing agent directly into the barrel of the extruder. A valve 14 is provided on line 12 to control the feeding. Line 16 connects the extruder 10 to the cylindrical barrel 22 of the spinning disc dispenser 20 and line 18 feeds the low viscosity fluid into the annulus between a rotating shaft 24 and the cylindrical barrel 22 of the dispenser 20. The rotating shaft 24 is located coaxially within the stationary, preferably smooth walled barrel 22 and comprises at least one spinning or rotating disc dispersion unit 26 comprising an alternating series of perforated 30-solid 32-perforated 30 discs. The head 40 of the shaft is preferably tapered to about 45° to minimize coalescence of the mixture at that point.

The outer surface of the discs are spaced from the inner wall of the stationary cylindrical barrel in such a manner that in intense shear region 34 is formed in the space between the outer edge of the solid disc 32 and the inner wall of the barrel 22 and close sliding contact 36 is provided between the perforated discs 30 and the inner wall of the barrel 22. The perforated discs 30 have several axially oriented apertures 38 located preferably in close proximity to the shaft surface. The number of apertures 38 in the perforated discs 30 depend upon the polymeric material being processed. Normally, the perforated discs have from 4 to 24 apertures located around the disc surface.

Although only one disc dispersion unit would be required, when working with certain high viscosity polymer melts, it is preferred that the shaft 24 have two or three disc dispersion units. As illustrated in FIG. 1, each additional disc dispersion unit 28 other than the first unit 26 comprises only a solid 32 and perforated disc 30. When additional units are employed, they are positioned in such a manner on the shaft that the first disc and the last disc are perforated and the continuity of perforated-solid-perforated is maintained.

It is preferred that the discs be spaced either approximately one-half to one inner barrel radius apart or such that the axial separation between discs approximately equals the shortest distance from the cylindrical barrel to the shaft surface to optimize viscoelastic polymer mixing. The thickness of the perforated disc is not critical provided sufficient thickness exists to maintain the mechanical integrity of the perforated disc. However, the solid disc should have a thickness from about ¼th to 1/24th the diameter of the barrel, and preferably from ⅛th to 1/12th the diameter of the barrel. Although the exactness of these dimensions are not absolutely critical, it has been found that if the solid discs are too thin, there is slippage of the low viscosity phase past the disc without efficient dispersion.

The disc dispersion units may be formed as an integral part of the shaft or they may be mounted thereon. It is understood that to meet the different requirements of the various materials which could be processed, the widths of the shearing regions, the thickness of the solid discs and the number of disc dispersion units may be varied as desired by having interchangeable shafts and-/or disc dispersion units depending whether the disc dispersion units 26 and 28 are mounted or an integral part of the shaft 24.

Extending from the head 40 of the disperser is a line 42 having a surge valve 43 thereon and connecting the dispenser 20 to the internal conduit 44' of a base member 44 which is shown resting on a support member 46. Extending upward from the base member 44 is an accumulator device which includes a cylinder 50 and a piston 52 reciprocally movable therein. The piston 52 is shown having a frusto-conical head 52' and a conventional O-ring 54 positioned around the piston 52 to provide a seal between the cylinder 50 and the piston 52. Attached to the rear of piston 52 and extending upward therefrom is a shaft 56.

A flange member 58 is attached to the other end of the shaft 56 and a piston 60 is located on the shaft at a position intermediate the piston 52 and the flange 58. The piston 60 is adapted to reciprocate within a piston housing 62. It should be noted that flange 58 is located at the uppermost functional end of the shaft 56 and need not be located at the actual physical end thereof. The configuration of the flange 58 is important only to the extent that it must extend from the shaft 56 and contact switches 64 and 66 during the reciprocal movement of the shaft 56.

Alternatively, photoelectric switches may be employed, if desired, thus eliminating the need for a projecting member on the shaft 56. A pair of photoelectric units may be positioned such that the shaft 56 blocks the light path of lower unit when the shaft moves upwardly from its lowest position and blocks the light path of an upper unit when it reaches the desired upper position.

Leading from the internal conduit 44' of the base member 44 is a line 70 which is connected to an internal conduit 72' of a second base member 72 which is also resting on the support member 46. Extending downward from the base member 72, and through the support member 46 is a filling nozzle 74. A plurality of filling nozzles may be employed to mold one or more foamed articles. The lower end of the nozzle 74 extends to and is flush with a mold cavity defined by a male mold half 76 and a female mold half 78. Mold half 78 is conveniently affixed to the support member 46 and the mold half 76 is supported by a reciprocating bed 77 adapted to provide for easy separation of the mold halves 76 and 78 to facilitate product removal. Slidably mounted in the nozzle 74 and the base member 72 is a rod 80. The upper end of the rod 80 is provided with a piston 82 which reciprocates within a piston housing 84. The housing 84 is provided with a pair of conduits 85 and 86 which are alternately connected to a source of gas under pressure.

The operation of the preferred apparatus shown in FIG. 1 is as follows: Thermoplastic material is fluxed in an extruder 10. A fluid blowing agent is admitted under pressure directly into the barrel of the extruder by means of line 12. The melted thermoplastic and fluid blowing agent which is passed from the extruder 10 is maintained at a temperature above the glass transition temperature of the thermoplastic and under a pressure substantially above the foaming pressure of the blowing agent. The extruder 10, which is in continuous communication with an annular zone 17 of the disperser 20 defined by the cylindrical barrel 22 and the rotating shaft 24, continuously extrudes the premixture through line 16 and into annular zone 17. Fluid blowing agent may alternatively or additionally be introduced separately into the annular zone 17 to be mixed with the premixture from the extruder 10. The premixture is forced through the dispenser 20, while the dispenser 20 is also maintained at a temperature and pressure above the foaming temperature and pressure of the fluid blowing agent. The shaft 24 is rotated by any suitable drive means such as an electric motor, at speeds of from 10 to 1,000 rpms. The shaft may therefore be operated at the same speeds as the extruder, or faster as desired.

The dispenser 20 is provided with heating means (not shown) to maintain the mixture in the molten state and thus prevent solidification of the thermoplastic material therein. Heating of the mixture in the dispenser 20 is not required. Heat is applied to the mixture in the extruder 10 and the temperature is maintained in the dispenser.

The low viscosity blowing agent is grossly broken up when passed through the high shear zone of the first rapidly-rotating perforated disc. the secondary flow patterns in the low shear mixing zone between the first perforated disc 30 and solid disc forces the low viscosity blowing agent to migrate to a position at the outer edge of the leading edge of the solid disc 32. The mixture is subjected to an intense shear gradient in passing into the intense shear region wherein the thermoplastic cavities and the blowing agent fills the areas abandoned by this cavitation. The shear gradient is such that the rate at which the polymer melt or solution flows from the mixing region after the first perforated disc to the intense shear region is greater than the characteristic relaxation time of the polymer melt or solution. Mixing further occurs in the low shear mixing zone 35 between the intense shear region and the second perforated disc. The apertures of the second perforated disc advantageously employs the viscoelasticity of the polymer to enhance the mixing characterized by viscoelastic secondary flow patterns, wherein the blowing agent is randomized throughout the melted thermoplastic. This cycle is then repeated when more than one disc dispersion units are provided in the disperser.

The phase "break up" is defined herein to mean the reduction in size of the bubbles or drops of the minor or low viscosity phase.

It is not critical to the present invention that melted thermoplastic and fluid blowing agent be introduced as a premixture from the extruder. Fluid blowing agent may be introduced separately into the dispersing unit from a line especially adapted for such purpose. Furthermore, the disperser of this invention may be incorporated directly into an extruder wherein random dispersion occurs within the extruder. In such application, the disc dispersion unit would be mounted on the extruder screw or would be an integral part thereof and the extruder would then be in direct communication with the accumulation zone.

The disperser 20, which is in communication with the expanding accumulation zone 45 defined by the cylinder 50, the piston 52 and the base member 44, continuously conveys the mixture of thermoplastic material and blowing agent through line 42, into the zone 45, and against the piston 52. A surge valve 43 is provided on line 42 to prevent significant pressure drop in disperser 20 during molding operation. As the mixture is fed from the disperser into the zone 45, the piston is forced from its lower-most position to an upper, predetermined position. The lower-most position of the piston 52 is reached when the piston 52, comes in contact with the base member 44. The upward travel of piston 52 and piston 60 is resisted by means of a gas under pressure in the region 51 above the piston 60 in the piston housing 62. The phase "gas under pressure" is intended to include any suitable hydraulic fluid conventionally used in such apparatus. In addition, the region 51 in the piston housing 62 is provided with a conduit 63 which is in communication with a source of gas under pressure. As the material from the disperser 20 forces piston 52 upward, and at the same time forces piston 60 upward, the gas in region 51 is compressed. Since the charging of the zone 45 is opposed by the piston 52, the filling of the zone 45 cannot start until the disperser pressure exceeds the back-pressure of the piston. As the piston moves upward, the gas volume in region 51 is decreased and the gas pressure is increased. The disperser pressure must continuously exceed the increasing piston pressure during the expansion of the zone 45. It must be noted that the disperser pressure is maintained by the constant pressure from the extruder which is in continuous communication with the disperser. Alternatively, during the expansion of the zone 45, the pressure of the gas in region 51 can be regulated so that a substantially constant force is applied to the piston 60. In any case, the mixture being charged into the expanding zone 45 must be maintained at a pressure above the foaming pressure thereof. While a pressure of as low as about 500 psi will normally prevent foaming of the mixture, pressure of at least 1,500 psi have been found to give best results. Pressures in excess of 10,000 psi are usually not required for proper operation of the accumulator device and normally should be avoided because operating expenses increase with increasing pressures.

In addition, the cylinder 50 is provided with heating means (not shown) to maintain the mixture in the molten state and thus prevent solidification of thermoplastic material therein. It should be noted, however, that similarly to the disperser 20, no heating of the mixture in the cylinder 50 is required. Heat is applied to the mixture in the extruder 10 and is only maintained in the cylinder 50 as in the disperser 20.

The piston 52 travels upward until the flange 58, carried by the shaft 56, contacts, the switch 66 located at a predetermined position. In a manner well known in the art, the activation of the switch 66 causes gas under pressure to enter piston housing 84 through conduit 85 and produces an upward motion of the piston 82. The lower end of the rod 80 is thereby withdrawn from the nozzle 74 until it reaches a position indicated by the reference numeral 87. Communication between the mold defined by mold halves 76 and 78 and the zone 45 is thus established. As the instant communication is established, the mixture is forced from the accumulation zone 45 into the mold because the pressure within the region 51, which has now become greater than the pressure within the zone 45, causes the downward motion of the piston 52 until it reaches its lower-most position. If necessary, the line 70 and the base member 72 can be provided with heating means, not shown, to prevent solidification of thermoplastic material therein. Normally however, the short molding cycles used in the present invention eliminate the need for any additional heating.

When the piston 52 reaches its lower-most position, the zone 45 is essentially collapsed and the flange 58 contacts the switch 66, and in a manner well known in the art, gas under pressure is caused to enter the piston housing 84 through conduit 86 thereby producing a downward movement of the piston 82 and the rod 80. At the instant the rod 80 enters the nozzle 74 at the point 73, communication is terminated between the mold and the accumulation zone 45 at a point where the pressure is above the foaming pressure of the mixture. As the rod travels downward, it forces the mixture in the nozzle 74, that is, between the point 73 and the mold, into the mold and the bottom of the rod comes flush with the molded article 79. In this manner, a sprue-free molded article is produced and the formation of an unfoamed slug in the system is prevented. It should be evident that the foamed articles can be molded according to the present invention having either a sprue or a depression simply by adjusting the rod 80. While it is preferred to mold sprue-free articles, the configuration of certain molded articles will be able to tolerate a sprue or a depression. It should be evident that the apparatus of this invention can be employed to mold solid thermoplastic articles Because of the great pressure differential between the mold and the accumulation zone, the mixture rapidly foams and expands in the mold. The filling of the mold, which is caused by the action of the piston 52, the rod 80, and the expansion of the mixture in the mold, should preferably involve a period of approximately 1 to 15 seconds.

The flow of gas under pressure through conduits 85 and 86 is controlled by means of a valve system actuated by the switches 64 and 66 in a manner well known in the art.

The switch 66 is positioned in accordance with the amount of material which is required to be charged into the mold. The greater the distance between the switches 66 and 64, the greater will be the upward travel of the piston 52. Consequently, a larger amount of material will be stored in the accumulation zone 45 and subsequently forced into the mold. Conversely, decreasing the space between the switches 66 and 64 decreases the amount of material which will be forced into the mold.

The apparatus of this invention is capable of rapidly and completely filling a mold to produce a foamed article which is substantially free of orientation and internal stresses (isotropic) comprising a foamed core and a substantially non-cellular integral peripheral shell. Problems common to solid injection molding such as incomplete filling of the mold due to premature solidification of the thermoplastic material and high residual internal stresses due to flow resistance in the mold are not encountered. The results obtained from practice of the present invention are believed to be a function of the desired weight of the finished foamed article, the temperature of the molten thermoplastic mixture, the amount of blowing agent in the mixture, the pressure required in the extruder and accumulation zone to prevent foaming of the mixture therein, mold temperature, and mold configuration. When the molten mixture in the accumulation zone, which is under a pressure greater than the foaming pressure thereof, is rapidly transferred to the mold, the pressure differential that exists between the accumulation zone and the mold causes the mixture to rapidly expand into a cellular mass or, in some instances, to explode into small cellular particles that fuse together in the mold, thereby rapidly filling the mold. Once the mold is initially filled with this cellular mass, more mixture is still entering the mold and its rapid expansion creates an outwardly acting pressure which forces the peripheral portion of the cellular mass against the surface of the mold thereby destroying its cell structure and forming a dense, non-cellular peripheral shin having a thickness of at least about 20 mols surrounding a cellular core. The blowing agent that is expelled during the destruction of the peripheral cells is vented out through suitable openings in the mold such as the miter or parting line in a two-part mold. The blowing gas in the act of venting is believed to create the unique mottled surface described above. Skin thickness is controlled by the temperature of the mixture and the pressure employed in the extruder and accumulation zone.

The temperature of the mold is not critical. Cold molds, e.g., at room temperatures, above 20°C. can be used to produce foamed articles having a dull mottled surface similar to the texture and appearance of wood. Lower mold temperatures are preferred since the time required for cooling the article in the mold is shorter. Higher mold temperatures permit more flow of the molten mixture in the mold prior to cooling than with a cooler mold and thus produce a smooth, glossy or glazed mottled surface. When molding high density polyethylene, mold temperatures of at least about 265°F. are used to produce a glossy mottled surface.

Molds which cause sharp pressure drops to take place therein, due to a complex configuration, or sharp corner or the like, require the use of a greater amount of blowing gas in order to achieve a particular degree of foaming than a mold which has, for example, a simple configuration like that of a bowling pin and which produces a more gradual pressure drop.

From the foregoing description, it is evident that the apparatus of the present invention can be employed to rapidly, efficiently, and automatically mold foamed thermoplastic articles on a batch, semi-continuous or continuous basis.

What is claimed is:

1. Apparatus for molding foamed thermoplastic articles characterized by a cellular core and a substantially non-cellular integral peripheral shell comprising:
    a. extruder means adapted to flux a thermoplastic material;
    b. disperser means connected to said extruder means for producing a dispersion of fluid blowing agent in the fluxed thermoplastic material comprising a cylindrical barrel having therein at least one rotatable disc dispersion unit with an alternating spaced series of perforated-solid rotating discs; said perforated disc, providing a high shear mixing zone, having outer edge surfaces in close rotating clearance with the inner walls of said barrel; the outer edge surface of said rotating disc being spaced from the inner walls of said barrel to form an intense shear mixing zone; and wherein said blowing agent is dispersed when passed through the apertures of said perforated disc and is intimately dispersed throughout the thermoplastic material when passed through said intense shear zone;
    c. accumulation chamber means in communication with said disperser adapted to receive the mixture from said disperser and to maintain said mixture in the molten state and at a pressure above the foaming pressure of said mixture;
    d. mold means adapted to be maintained at a pressure no greater than the pressure at which said mixture foams and expands;
    e. means for establishing and terminating communication between said mold means and said accumulation means at a point wherein the pressure is above the foaming pressure of said mixture; and
    f. means connected to said accumulator for rapidly forcing said mixture out of said accumulation means and into said mold when communication is established therebetween.

2. The device of claim 1 wherein said discs are spaced at least one-half inner barrel radius apart.

3. The device of claim 1 wherein said solid disc has a thickness of from ⅛ to 1/12 the diameter of said barrel.

4. Apparatus of claim 1 wherein means are provided for removing the mixture between said means for establishing and terminating communication and said mold after communication is terminated between said mold accumulation chamber.

5. Apparatus of claim 1 wherein means are provided for rapidly forcing the mixture between said means for establishing and terminating communication and said mold into said mold when communication is terminated between said mold and said accumulation chamber.

* * * * *

UNITED STATES PATENT OFFICE
CERTIFICATE OF CORRECTION

Patent No. 3,941,529  Dated March 2, 1976

Inventor(s) Ward J. Klingebiel

Page 1 of 2

It is certified that error appears in the above-identified patent and that said Letters Patent are hereby corrected as shown below:

In the abstract, line 4 of (b), "ratatable" should read "rotatable".

In the abstract, line 3 of (e), "in" should read "is".

Column 1, line 41, correct the patent number to read "3,239,882".

Col. 2, line 29, after "mold", insert "when".

Col. 4, lines 27 and 30, "dispenser" should read "disperser".

Col. 4, line 39, after "that", "in" should read "an".

Col. 5, line 19, "dispenser" should read "disperser".

Col. 6, line 18, "dispenser" should read "disperser" in both instances.

Col. 6, lines 26, 29 and 32, "dispenser" should read "disperser".

Col. 7, line 19, "phase" should read "phrase".

Col. 7, line 59, delete the comma after "contacts".

UNITED STATES PATENT OFFICE
CERTIFICATE OF CORRECTION

Patent No. 3,941,529　　　　　　　　　Dated March 2, 1976

Inventor(s) Ward J. Klingebiel

It is certified that error appears in the above-identified patent and that said Letters Patent are hereby corrected as shown below:

Col. 8, line 28, delete "the".

Col. 8, line 33, after "should" insert "also".

Col. 8, line 35, put a period at the end of the line.

Col. 9, line 19, "shin" should read "skin".

Col. 9, line 21, "agent" should read "gas".

Col. 10, line 32 (claim 1), "wherein" should read "where".

Col. 10, line 46 (claim 4), before "accumulation", insert "and said".

Signed and Sealed this fifteenth Day of June 1976

[SEAL]

Attest:

RUTH C. MASON
Attesting Officer

C. MARSHALL DANN
Commissioner of Patents and Trademarks